Figure 1:
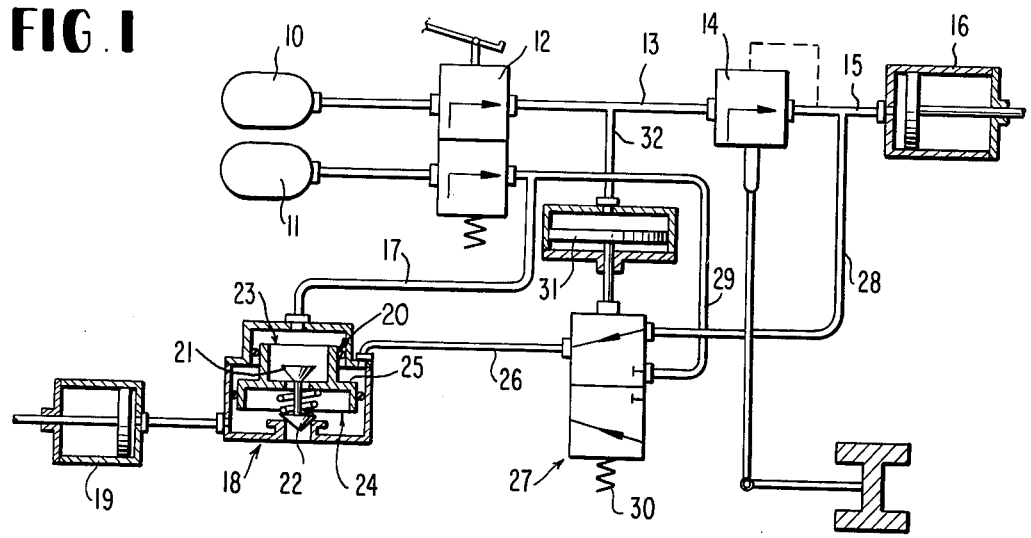

United States Patent [19]
Scholz

[11] 3,964,794
[45] June 22, 1976

[54] LOAD-DEPENDENT TWO-CIRCUIT BRAKE FOR VEHICLES, ESPECIALLY FOR TRUCKS, BUSSES OR THE LIKE

[75] Inventor: Helmuth Scholz, Bischweier, Germany

[73] Assignee: Daimler-Benz Aktiengesellschaft, Germany

[22] Filed: Oct. 4, 1973

[21] Appl. No.: 403,532

[30] Foreign Application Priority Data
Oct. 5, 1972   Germany............................ 2248923

[52] U.S. Cl................................ 303/6 C; 188/195; 188/349; 303/22 R
[51] Int. Cl.² ........................ B60T 8/18; B60T 8/26
[58] Field of Search............. 303/22 R, 22 A, 84 A, 303/84 R, 6 C, 6 R, 2, 7, 23, 21 F, 40; 188/195, 349; 137/112, 113

[56] References Cited
UNITED STATES PATENTS

| | | |
|---|---|---|
| 3,148,919 | 9/1964 | Simmons et al.................... 303/22 R |
| 3,252,740 | 5/1966 | Stelzer ................................. 303/6 C |
| 3,415,576 | 12/1968 | Henry-Biabaud ................. 303/22 R |
| 3,674,317 | 7/1972 | Margold ............................. 303/21 F |
| 3,729,237 | 4/1973 | Ishikawa et al. ................. 303/6 C X |
| 3,773,367 | 11/1973 | Osborne et al.................... 303/22 R |
| 3,838,887 | 10/1974 | Stelzer ................................. 303/6 C |

*Primary Examiner*—Duane A. Reger
*Assistant Examiner*—Douglas C. Butler
*Attorney, Agent, or Firm*—Craig & Antonelli

[57] ABSTRACT

A load-dependent two-circuit brake for vehicles, especially for trucks, busses or the like which includes a load-dependent control valve arranged in the first brake circuit containing the rear-wheel brakes while another control valve is coordinated to the second brake circuit containing the front wheel brakes which has a predetermined transmission ratio and which is adapted to be acted upon by the control pressure in the first brake circuit in such a manner that the transmission ratio is adapted to be changed in the same sense as the control pressure in the first brake circuit.

13 Claims, 2 Drawing Figures

LOAD-DEPENDENT TWO-CIRCUIT BRAKE FOR VEHICLES, ESPECIALLY FOR TRUCKS, BUSSES OR THE LIKE

The present invention relates to a load-dependent two-circuit brake for vehicles, especially for trucks, busses or the like, whereby a control valve which is controlled in dependence on the load, is arranged in the first brake circuit containing the rear wheel brakes.

With heavy vehicles the rear-wheel brakes are oftentimes controlled in the prior art as a function of the load. This is done because the load change becomes effective primarily at the rear axle.

For achieving a predetermined brake deceleration with a given brake pressure, it is desirable to control also the front axle in dependence on the load. This, of course, could take place in that also a load-dependent control device is built in at the front axle. However, this is oftentimes connected with difficulties for spatial reasons. The present invention is therefore concerned with the task to propose a way, by means of which the load-dependent control of the front axle can be achieved with simple means.

The underlying problems are solved according to the present invention with the aforementioned brakes in that a control valve is coordinated to the second brake circuit containing the front wheel brakes, which has a constant transmission ratio and which is adapted to be acted upon by the controlled pressure in the first brake circuit in such a manner that the transmission ratio is adapted to be changed in the same sense as the control pressure in the first brake circuit.

The construction according to the present invention entails the advantage that also the front axle is incorporated into the load-dependent control system by constructive and structurally simple means.

According to a further development of the inventive concept the control valve is adapted to be selectively acted upon in dependence on the pressure in the first brake circuit by a shifting valve with the controlled pressure (first position) of the first brake circuit or the uncontrolled pressure (second position) of the second brake circuit in such a manner that when a pressure exists in the first brake circuit, the control pressure thereof is effective and when the first brake circuit becomes pressureless, the pressure in the second brake circuit is effective. The advantage is achieved thereby that in case of failure of the rear axle brake, the front axle brake is not also impaired in a non-permissive manner, i.e., will be therefore controlled down or reduced corresponding to the transmission ratio of the control valve. Rather, the front axle is acted upon with the full brake pressure prevailing in the second brake circuit in case of a failure of the rear axle brake circuit.

In one embodiment according to the present invention, the control valve is constructed as conventional no-load or empty-load valve with a differential piston controlling an inlet valve and an outlet valve, which differential piston includes a small piston area acted upon by the feed pressure, a large piston area acted upon by the brake pressure in the second circuit and a differential area acted upon by the control pressure. The annular space of the control valve which accommodates the differential area can thereby be connected advantageously with the outlet of the shifting valve whose first inlet is in communication with a line leading to the controlled pressure in the first circuit and whose second inlet is in communication with a line conducting the pressure in the second circuit as represented by the pressure medium thereof.

With the proposed embodiment, the switching valve is advantageously retained in its second position by a spring force and is displaced into its first position against this spring force during the pressure build-up in the first brake circuit. The possibility exists thereby to coordinate to the shifting valve as actuating member a servo-piston adapted to be acted upon by the pressure in the first brake circuit.

Another possibility resides in that a solenoid magnet is coordinated to the shifting valve as actuating member and the solenoid magnet is adapted to be engaged by means of a magnetic switch acted upon by the pressure in the first brake circuit. It will be appropriate in both cases to permit the actuating members to respond already at a slight pressure in the first brake circuit.

Accordingly, it is an object of the present invention to provide a load-dependent two-circuit brake system for vehicles, especially for trucks, busses or the like, which avoids by simple means the aforementioned shortcomings and drawbacks encountered in the prior art.

Another object of the present invention resides in a load-dependent two-circuit brake for vehicles which permits a load-dependent control also of the front axle without requiring a large amount of space.

A further object of the present invention resides in the load-dependent two-circuit brake for vehicles, especially for trucks, busses or the like which provides a load-dependent control not only of the rear axle but also of the front axle by simple and space-saving means.

Still a further object of the present invention resides in a two-circuit brake system for vehicles in which the front axle is also incorporated into the load-dependent control system of the rear axle by constructive and structurally simple means.

Still a further object of the present invention resides in a load-dependent control system for the rear and front axles of a vehicle in which the proper braking operation of the front axle is not impaired in case of failure of the rear axle brake system.

Another object of the present invention resides in a two circuit brake system for vehicles, such as trucks, busses and the like in which in case of a failure of the rear axle brake circuit, the front axle brake circuit is acted upon with the full brake pressure prevailing in its associated brake circuit.

Figure 2:
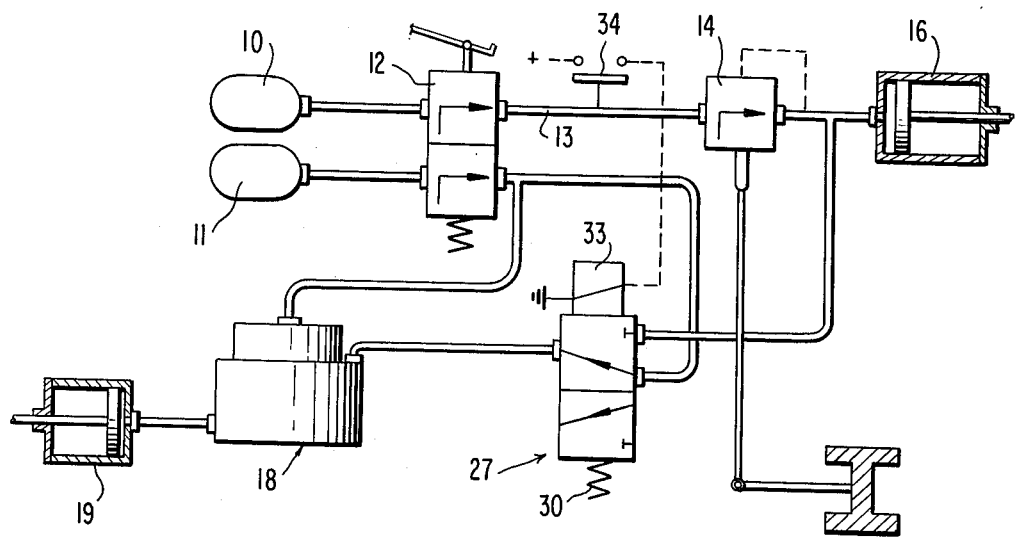

These and other objects, features and advantages of the present invention will become more apparent from the following description when taken in connection with the accompanying drawing which shows, for purposes of illustration only, two embodiments in accordance with the present invention, and wherein:

FIG. 1 is a schematic view of one embodiment of a load-dependent two-circuit brake system for vehicles in accordance with the present invention; and FIG. 2 is a schematic view of a modified embodiment of a load-dependent two-circuit brake system for vehicles in accordance with the present invention.

Referring now to the drawing wherein like reference numerals are used throughout the two views to designate like parts, and more particularly to FIG. 1, the brake pressure is conducted out of the tanks 10 and 11 by way of the two-circuit brake valve 12 through the line 13 and by way of the load-dependent control valve 14 and the line 15 to the brake cylinders 16 of the rear axle brakes. The load-dependent control valve 14 is of conventional construction and may be, for example, of the type disclosed in U.S. Pat. Nos. 3,148,919 or 3,773,367. In the second brake circuit the line 17 conducts the pressure to the brake cylinders 19 of the front wheel brakes downstream of the two-circuit brake valve 12 by way of a no-load valve generally designated by reference numeral 18. The no-load valve 18 contains a stepped or differential piston 20 which controls an inlet valve 21 and an outlet valve 22. This stepped piston 20 has a predetermined transmission ratio which is given by the area 23 acted upon by the uncontrolled brake pressure from the line 17 and the area 24 acted upon by the controlled brake pressure. The annular area 25 is in communication by way of a line 26 with a conventional shifting valve generally designated by reference numeral 27 and indicated only schematically. This shifting valve 27 connects the line 26 selectively by way of the line 28 with the line 15 conducting the controlled pressure in the first brake circuit and thus with a corresponding place of a first brake circuit (first position) or by way of the line 29 with the uncontrolled pressure of the second brake circuit (second position). The arrangement is thereby made in such a manner that the shifting valve 27 is retained in the second position thereof by a spring 30. A servo-piston 31 is coordinated to the shifting valve 27 as actuating member, which is adapted to be acted upon by the pressure in the first brake circuit by way of the line 32, and which displaces the valve 27 into the first position. If in the illustrated first position the two-circuit brake valve 12 is actuated, then the rear wheel brakes receive the controlled pressure. This controlled pressure additionally acts upon the annular surface 25 in the no-load valve 18 by way of the lines 28 and 26 so that also the pressure at the front wheel brakes is controlled correspondingly to the load. If the first brake circuit should thereby fail completely, i.e., if the line 13 of the first brake circuit should become pressureless, then the shifting valve 27 is shifted into the second position thereof by the spring 30, i.e., the line 29 is then connected with the line 26. In this case the annular surface 25 at the no-load valve 18 receives the full pressure of the second brake circuit so that also the front wheel brakes 19 are acted upon by the full pressure thereof.

According to FIG. 2, the construction and operation of the overall installation is the same. A solenoid magnet 33 is now coordinated to the shifting valve 27 as actuating member, which upon energization shifts the shifting valve 27 into its first position against the spring 30. The solenoid magnet 33 is selectively energized and de-energized by a conventional magnetic switch 34 which is acted upon in a conventional manner by the pressure in the first brake circuit, i.e., for example, by the pressure in the line 13.

While I have shown and described only two embodiments in accordance with the present invention, it is understood that the same is not limited thereto but is susceptible of numerous changes and modifications as known to those skilled in the art. For example, the no-load valve 18 and the shifting valve 27 could be structurally combined into a single valve structure. Furthermore, any conventional, known element may be used for elements 14, 18 and 27 of the instant application. Hence, I do not wish to be limited to the details shown and described herein but intend to cover all such changes and modifications as are encompassed by the scope of the appended claims.

What is claimed is:
1. A load-dependent two-circuit brake for vehicles, which comprises means for providing a first brake circuit associated with rear wheel brakes, means for providing a second brake circuit associated with front wheel brakes, and a regulating valve means arranged in the first brake circuit means which is controlled in dependence of the load for producing a controlled pressure which varies in accordance with the load, characterized in that a control valve means for controlling the second brake circuit means is operatively connected with the second brake circuit means, said control valve means having a predetermined transmission ratio, and connecting means for actuating said control valve means by the controlled pressure in the first brake circuit means for changing the transmission ratio of the control valve means in the same sense as the variation of the controlled pressure in the first brake circuit means, and characterized by shifting valve means for selectively subjecting the control valve means to the controlled pressure in the first brake circuit means or to the uncontrolled pressure in the second brake circuit means in dependence on the pressure in the first brake circuit means, the shifting valve means being responsive to the presence of a pressure in the first brake circuit means for applying the controlled pressure thereof to the control valve means and being responsive to a pressureless first brake circuit means for applying the pressure in the second brake circuit means to the control valve means.

2. A two circuit brake according to claim 1, characterized in that the vehicles are trucks, busses and similar vehicles.

3. A two circuit brake according to claim 1, characterized in that the control valve means is constructed as a no-load valve means having a differential piston controlling an inlet valve and an outlet valve, said differential piston having a small piston area on which acts a feed pressure, a large piston area on which acts the brake pressure in the second brake circuit means and a differential area on which acts the control pressure.

4. A two circuit brake according to claim 3, characterized in that the control valve means has an annular space for accommodating the differential area and which is operatively connected with the outlet of the shifting valve means, the shifting valve means having a first input in communication with a line leading to the controlled pressure in the first brake circuit means and a second input in communication with a line leading to the pressure in the second brake circuit means.

5. A two circuit brake according to claim 4, characterized in that the shifting valve means is retained by a spring force in a second position and is displaced into a first position against the spring force upon pressure build-up in the first circuit means.

6. A two circuit brake according to claim 5, characterized in that a servo piston acted upon by the pressure build-up in the first brake circuit means is operatively associated with the shifting valve means as an actuating member thereof.

7. A two circuit brake according to claim 5, characterized in that a solenoid magnet is operatively associated with the shifting valve means as an actuating member thereof and in that the solenoid magnet is engageable by a magnetic switch acted upon by the pressure build-up in the first brake circuit means.

8. A load-dependent two-circuit brake for vehicles, which comprises means for providing a first brake circuit associated with rear wheel brakes, means for providing a second brake circuit associated with front wheel brakes, and a regulating valve means arranged in the first brake circuit means which is controlled in dependence of the load for producing a controlled pressure which varies in accordance with the load, characterized in that a control valve means for controlling the second brake circuit means is operatively connected with the second brake circuit means, said control valve means having a predetermined transmission ratio, and connecting means for actuating said control valve means by the controlled pressure in the first brake circuit means for changing the transmission ratio of the control valve means in the same sense as the variation of the controlled pressure in the first brake circuit means, the control valve means being constructed as a no-load valve means having a differential piston controlling an inlet valve and an outlet valve, said differential piston having a small piston area on which acts a feed pressure, a large piston area on which acts the brake pressure in the second brake circuit means and a differential area on which acts the control pressure.

9. A two circuit brake according to claim 8, characterized in that the control valve means has an annular space for accommodating the differential area and which is operatively connected with the outlet of a shifting valve means, the shifting valve means having a first input in communication with the line leading to the controlled pressure in the first brake circuit means and a second input in communication with a line leading to the pressure in the second brake circuit means.

10. A two circuit brake according to claim 9, characterized in that the shifting valve means is retained by a spring force in a second position and is displaced into a first position against the spring force upon pressure build-up in the first circuit means.

11. A two circuit brake according to claim 9, characterized in that a servo piston acted upon by the pressure build-up in the first brake circuit means is operatively associated with the shifting valve means as an actuating member thereof.

12. A two circuit brake according to claim 9, characterized in that a solenoid magnet is operatively associated with the shifting valve means as an actuating member thereof and in that the solenoid magnet is engageable by a magnetic switch acted upon by the pressure build-up in the first brake circuit means.

13. A two circuit brake according to claim 9, characterized by shifting valve means for selectively subjecting the control valve means to the controlled pressure in the first brake circuit means or to the uncontrolled pressure in the second brake circuit means in dependence on the pressure in the first brake circuit means in such a manner that in the presence of a pressure in the first brake circuit means, the controlled pressure thereof becomes effective on the control valve means and in case of a pressureless first brake circuit means, the pressure in the second brake circuit means becomes effective on the control valve means.

* * * * *